(12) United States Patent
Mason et al.

(10) Patent No.: US 6,770,731 B2
(45) Date of Patent: Aug. 3, 2004

(54) POLYCARBONATE HAVING PRONOUNCED SHEAR THINNING BEHAVIOR

(75) Inventors: James Mason, Krefeld (DE); Silke Kratschmer, Krefeld (DE); Uwe Hucks, Alpen (DE)

(73) Assignee: Bayer Aktiengesellschaft, Leverkusen (DE)

(*) Notice: Subject to any disclaimer, the term of this patent is extended or adjusted under 35 U.S.C. 154(b) by 81 days.

(21) Appl. No.: 10/104,573

(22) Filed: Mar. 22, 2002

(65) Prior Publication Data
US 2003/0013839 A1 Jan. 16, 2003

(30) Foreign Application Priority Data

Mar. 26, 2001 (DE) .......... 101 14 809
May 10, 2001 (DE) .......... 101 22 493

(51) Int. Cl.$^7$ .............. C08G 6/00
(52) U.S. Cl. .......... 528/196; 264/219; 502/9; 528/198
(58) Field of Search ............ 264/219; 502/9; 528/196, 198

(56) References Cited

U.S. PATENT DOCUMENTS 5,932,683 A   8/1999  Hachiya et al. ............ 528/196
6,228,973 B1 * 5/2001  McCloskey et al. ........ 528/196

OTHER PUBLICATIONS

Angew. Chemie, No. 20, Oct. 21, 1956, pp. 633–640, Von Dr. H. Schnell, "Polycarbonate, Eine Gruppe neuartiger thermoplastischer Kunststoffe".

* cited by examiner

Primary Examiner—Terressa Boykin
(74) Attorney, Agent, or Firm—Joseph C. Gil; Aron Preis; Gary F. Matz

(57) ABSTRACT

A branched melt-polymerized polycarbonate having pronounced non-Newtonian flow behavior is disclosed. The polycarbonate is suitable for preparing molding compositions and the preparation of a variety of molded articles.

10 Claims, No Drawings

POLYCARBONATE HAVING PRONOUNCED SHEAR THINNING BEHAVIOR

FIELD OF THE INVENTION

The invention relates to a novel branched melt-polymerized polycarbonate having pronounced non-Newtonian flow behavior, to compositions containing it and to molded articles produced therefrom. The invention relates also to a process for the preparation of such a polycarbonate.

SUMMARY OF THE INVENTION

A branched melt-polymerized polycarbonate having pronounced non-Newtonian flow behavior is disclosed. The polycarbonate is suitable for preparing molding compositions and the preparation of a variety of molded articles.

BACKGROUND OF THE INVENTION

Polycarbonate is produced industrially by means of the interface process or by transesterification in the melt (melt polymerization process). The melt polymerization process is becoming increasingly of interest because it can be carried out without the use of phosgene or chlorinated solvents. Polycarbonates produced by the interface process, which is mainly used nowadays, are linear, such polymers containing no multifunctional structural units. This type of linear polycarbonate, which lacks the multifunctional structural units capable of branching, has only slight non-Newtonian flow behavior. In order to achieve branching during the interface process, a branching agent must be added. Owing to the resulting branching with multifunctional structural units, the flowability of the polymer at a low shear rate is increased and at a high shear rate is reduced.

Polycarbonates produced by the melt polymerization process necessarily contain multifunctional structural units. The unavoidable production of multifunctional branching structural units during the polymerization is known and is described, for example, in Angewandte Chemie 20, p. 633–660, 1956.

U.S. Pat. No. 5,932,683 describes a melt process whereby a melt polycarbonate having three particular structural units is formed. A particular relationship between the reaction time and the reaction temperature is mentioned as a parameter for the preparation of that polycarbonate. The described polycarbonate exhibits particularly ready flow behavior at high shear rates. However, that flow behavior is usually coupled with poor flowability at low shear rates.

The object was, therefore, to develop a melt polycarbonate which, in addition to having good flowability at high shear rates, is not less flowable than unbranched polycarbonate at low shear rates.

DETAILED DESCRIPTION OF THE INVENTION

The object was achieved by a melt process, which does not correspond to the parameters mentioned in U.S. Pat. No. 5,932,683, which produces a melt polycarbonate containing a novel tetrafunctional structural unit. However, that particular branched polycarbonate nevertheless exhibits flow behavior at a low shear rate that is comparable to the flow behavior of unbranched polycarbonate from the interface, while the flow behavior at a high shear rate is improved. The polycarbonate according to the invention may therefore be used particularly successfully in injection molding, and it is, moreover, comparable to an unbranched polycarbonate when it is extruded.

The polycarbonate according to the invention has the general formula (1)

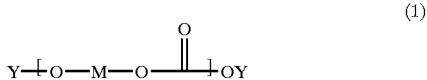

(1)

wherein the square brackets enclose repeating structural units of the polycarbonate,
M denotes Ar or a multifunctional compound A,
wherein
Ar conforms to formula (2)

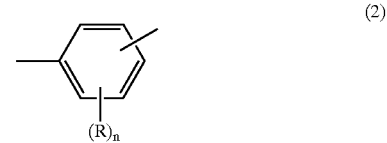

(2)

or, particularly preferably, to formula (3)

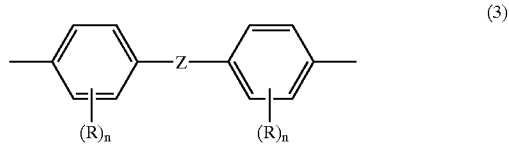

(3)

wherein

Z is $C_1$–$C_8$-alkylidene or $C_5$–$C_{12}$-cycloalkylidene, S, $SO_2$ or a single bond,
R is a substituted or unsubstituted phenyl, methyl, propyl, ethyl, butyl, Cl or Br, and
n represents 0, 1 or 2, wherein
Y is H or a group conforming to formula (4)

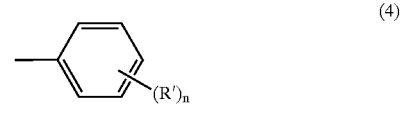

(4)

wherein

R' denotes H, $C_1$–$C_{20}$-alkyl, $C_6H_5$ or $C(CH_3)_2C_6H_5$ and where there are several R groups they may be identical or different one from the others, and
n represents 0, 1 or 2, wherein the multifunctional compound A is a compound of the formula

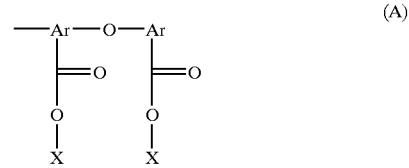

(A)

wherein
X denotes Y or —(MOCOO)Y,
wherein M+Y has the above-mentioned meaning, that may be present in the polycarbonate in an amount of from 201 to 5000 ppm, preferably from 350 to 2000 ppm and most preferably from 300 to 1000 ppm. Compound A is particularly preferably a compound of the formula

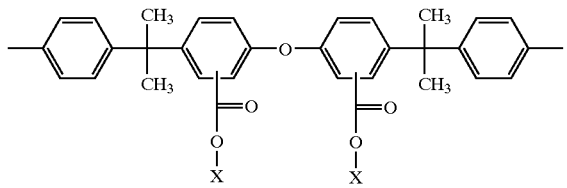
(A1)

The polycarbonate according to the invention may additionally contain compounds B, C and D.
Compound B is a multifunctional compound of the formula (B)

—Ar—
|
C=O
|
O
|
X and may be present in the polycarbonate in an amount of from 1501 to 10,000 ppm, preferably from 1550 to 3000 ppm, most preferably from 1600 to 2000 ppm. Compound B is particularly preferably a compound of the formula (B1)

Compound C is a multifunctional compound of the formula (C)

—Ar—O—Ar
|
C=O
|
O
|
X and may be present in the polycarbonate in an amount of from 351 to 5000 ppm, preferably from 400 to 2000 ppm and most preferably from 450 to 1000 ppm.
Compound C is particularly preferably a compound of the formula (C1)

In compounds A1, B, B1, C and C1, X is as defined for compound A.

Compound D is a compound of the formula

(D)

and may be present in the polycarbonate in an amount of from 751 to 5000 ppm, preferably from 800 to 2000 ppm, most preferably from 850 to 1500 ppm.
Compound D is particularly preferably a compound of the formula

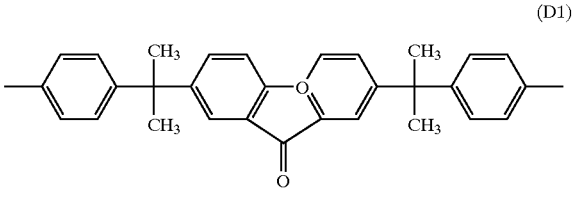
(D1)

The polycarbonate according to the invention may have a weight-average molecular weight, determined by gel permeation chromatography, of from 5000 to 80,000, preferably from 10,000 to 60,000 and most preferably from 15,000 to 40,000.
The polycarbonate according to the invention may also be defined by the shear thinning ratio y in accordance with the equation $y > 0.30 + 0.1312 x^{14.881}$, wherein x is the relative viscosity of the polycarbonate. The shear thinning ratio serves to quantify the flow behavior. The shear thinning ratio is the ratio of the viscosity at a low shear rate to the viscosity at a high shear rate. According to the invention, the shear thinning ratio is the ratio of the viscosity at a shear rate of 50 s$^{-1}$ to the viscosity at a shear rate of 5000 s$^{-1}$ measured at 280° C.

Despite the high number of branchings and the pronounced non-Newtonian flow behavior associated therewith, the polycarbonate according to the invention has excellent color and color stability during injection molding. It exhibits markedly less yellowing than do the known melt polycarbonates.

The preparation of aromatic polycarbonates by the melt transesterification process is known and is described, for example, in "Schnell", Chemistry and Physics of Polycarbonates, Polymer Reviews, Vol. 9, Interscience Publishers, New York, London, Sydney 1964, reference is made to D. C. PREVORSEK, B. T. DEBONA and Y. KESTEN, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75–90 (1980), to D. Freitag, U. Grigo, P. R. Müller, N. Nouvertne, BAYER AG, "Polycarbonates" in Encyclopedia of Polymer Science and Engineering, Vol. 11, Second Edition, 1988, pages 648–718, and finally to Des. U. Grigo, K. Kircher and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117–299, all incorporated by reference herein.

The polycarbonate according to the invention, which may also be a polyester carbonate, is prepared by the melt transesterification reaction of suitable diphenols and carbonic acid diaryl esters in the presence of a suitable catalyst. The polycarbonate may also be prepared by the condensation of carbonate oligomers, which contain hydroxy or carbonate terminal groups, and suitable diphenols as well as carbonic acid diaryl esters.

Suitable carbonic acid diaryl esters in connection with the invention are di-$C_6$- to $C_{14}$-aryl esters, preferably the diesters of phenol or of alkyl-substituted phenols, i.e. diphenyl carbonate, dicresyl carbonate and di-4-tert-butylphenyl carbonate. Diphenyl carbonate is most preferred.

Suitable carbonate oligomers are described by the above formula (1) with molecular weights of from 220 to 15,000.

The suitable di-$C_6$–$C_{14}$-aryl esters also include asymmetrical diaryl esters, which contain a mixture of aryl substituents. Phenylcresyl carbonate and 4-tert-butylphenylphenyl carbonate are most preferred.

The suitable diaryl esters also include mixtures of more than one di-$C_6$–$C_{14}$-aryl ester. The mixtures that are most preferred are mixtures of diphenyl carbonate, dicresyl carbonate and di-4-tert-butylphenyl carbonate.

Based on 1 mol. of diphenol, the carbonic acid diaryl esters may be used in amounts of from 1.00 to 1.30 mol., particularly preferably in amounts of from 1.02 to 1.20 mol. and most preferably in amounts of from 1.05 to 1.15 mol.

Suitable dihydroxybenzene compounds in connection with the invention are those which correspond to the formula (5):

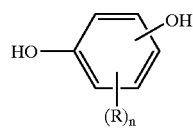

(5)

wherein

R is a substituted or unsubstituted phenyl, methyl, propyl, ethyl, butyl, Cl or Br, and
n represents 0, 1 or 2.

Dihydroxybenzene compounds that are most preferred are 1,3-dihydroxybenzene, 1,4-dihydroxybenzene and 1,2-dihydroxybenzene.

Suitable diphenols in connection with the invention are those which correspond to the formula (6):

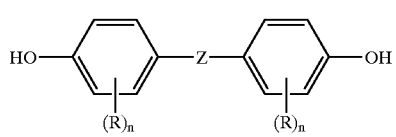

(6)

wherein

Z is $C_1$–$C_8$-alkylidene or $C_5$–$C_{12}$-cycloalkylidene, S, $SO_2$ or a single bond, R is a substituted or unsubstituted phenyl, methyl, propyl, ethyl, butyl, Cl or Br, and
n represents 0, 1 or 2. Preferred diphenols are 4,4'-dihydroxydiphenyl, 4,4'-dihydroxydiphenyl sulfide, 1,1-bis(4-hydroxyphenyl)cyclohexane, 1,2-bis(4-hydroxyphenyl)benzene, 1,3-bis(4-hydroxyphenyl) benzene, 1,4-bis(4-hydroxyphenyl)benzene, bis(4-hydroxyphenyl)methane, 2,2-bis(4-hydroxyphenyl) propane, 2,4-bis(4-hydroxyphenyl)-2-methylbutane, 2,2-bis(3-methyl-4-hydroxyphenyl)-propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, bis(4-hydroxyphenyl)sulfone, 1,2-bis[2-(4-hydroxyphenyl)isopropyl]benzene, 1,3-bis [2-(4-hydroxyphenyl)isopropyl]benzene, 1,4-bis[2-(4-hydroxyphenyl)isopropyl]benzene, 1,1-bis(4-hydroxyphenyl)-1-phenylethane, 2,4-bis(4-hydroxyphenyl)-2-methylbutane, 2,2-bis(3,5-dichloro-4-hydroxyphenyl)propane, 2,2-bis(3,5-dibromo-4-hydroxyphenyl)propane, 1,1-bis(4-hydroxyphenyl)-3,3, 5-trimethylcyclohexane.

The diphenols that are most preferred are 1,1-bis(4-hydroxyphenyl)-1-phenylethane, 2,2-bis(4-hydroxyphenyl) propane, 4,4'-dihydroxydiphenyl, 1,1-bis(4-hydroxyphenyl)-3,3,5-trimethylcyclohexane, 2,2-bis(3,5-dibromo-4-hydroxyphenyl)propane and 1,3-bis[2-(4-hydroxyphenyl)isopropyl]benzene.

The suitable diphenols also include mixtures of more than one diphenol; in that case, a copolycarbonate would form. The mixtures that are most preferred are 1,3-bis[2-(4-hydroxyphenyl)isopropyl]benzene, 1,1-bis(4-hydroxyphenyl)-3,3,5-trimethylcyclohexane, 2,2-bis(4-hydroxyphenyl)propane, 4,4'-dihydroxydiphenyl and 2,2-bis(3,5-dibromo-4-hydroxyphenyl)propane.

It is additionally possible to add a branching agent, such as compounds containing three functional phenolic OH groups. This would obviously branch the polymer and would increase the non-Newtonian character of the polymer. The suitable branching agents include phloroglucinol, 3,3-bis(3-methyl-4-hydroxyphenyl)-2-oxo-2,3-dihydroindole, 4,6-dimethyl-2,4,6-tris(4-hydroxyphenyl)-hept-2-ene, 4,6-dimethyl-2,4,6-tris(4-hydroxyphenyl)heptane, 1,3,5-tris(4-hydroxyphenyl)benzene, 1,1,1-tris(4-hydroxyphenyl) ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2, 4-dihydroxyphenyl)propane, hexakis(4-(4-hydroxyphenylisopropyl)phenyl) orthoterephthalate, tetrakis(4-hydroxyphenyl)methane, tetrakis(4-(4-hydroxyphenylisopropyl)phenoxy)methane and 1,4-bis((4', 4''-dihydroxy-triphenyl)methyl)benzene, isatinbiscresol, pentaerythritol, 2,4-dihydroxybenzoic acid, trimesic acid, cyanuric acid.

Suitable catalysts for the preparation of the polycarbonates according to the invention are, for example, those of the general formula

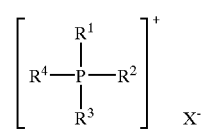

(7)

wherein $R^1$, $R^2$, $R^3$ and $R^4$ denote the same or different $C_1$- to $C_{18}$-alkylenes, $C_6$- to $C_{10}$-aryls or $C_5$- to $C_6$-cycloalkyls and $X^-$ represents an anion, in which the corresponding acid-base pair $H^++X^-\leftrightharpoons HX$ has a $pK_b$ of <11, as well as a co-catalyst.

Preferred catalysts are tetraphenylphosphonium fluoride, tetraphenylphosphonium tetraphenylborate and tetraphenylphosphonium phenolate. Tetraphenylphosphonium phenolate is most preferred. Preferred amounts of phosphonium salt catalysts are $10^{-2}$ to $10^{-8}$ mol. per mol. of diphenol, and the amounts of catalyst that are most preferred are $10^{-4}$ to $10^{-6}$ mol. per mol. of diphenol. Further co-catalysts may be used in addition to the phosphonium salt in order to increase the rate of polymerization. Such co-catalysts include salts of alkali metals and alkaline earth metals, such as hydroxides, alkoxides and aryl oxides of lithium, sodium and potassium, preferably hydroxide, alkoxide or aryl oxide salts of sodium. Sodium hydroxide and sodium phenolate are most preferred. The amounts of the co-catalyst are in the range from 201 to 10,000 ppb, preferably from 220 to 1500 ppb and most preferably from 240 to 500 ppb, in each case calculated as sodium.

The polycarbonates may be prepared in stages at temperatures of from 150 to 400° C., the dwell time in each stage may be from 15 minutes to 5 hours, and the pressures are from 1000 to 0.01 mbar.

The invention also provides polycarbonate compositions containing the polycarbonates according to the invention, as well as molded articles containing such compositions.

In addition to the polycarbonates or polyester carbonates, the compositions according to the invention may contain further polymeric constituents and conventional additives. Possible polymeric constituents include styrene/acryl/nitrile terpolymers (SAN), acryl/butadiene/styrene terpolymers (ABS), polymethyl methacrylate (PMMA), fluorinated polyolefins (PTFE), polyphenylstyrene (PPS), polyolefins such as polyethylene, polypropylene and ethylene/propylene rubbers, epoxy resins, polyesters such as polybutylene terephthalate (PBT), polyethylene terephthalate (PET), polycyclohexenedimethanol (PCT), copolyesters of ethylene glycol and cyclohexenedimethanolterephthalic acid in a ratio of the two constituents of 1:4 (PCTG), copolyesters of ethylene glycol and cyclohexenedimethanolterephthalic acid in a ratio of the two constituents of 4:1 (PETG), as well as other polycarbonates produced by the interface process, and mixtures of the above-mentioned components. Further additives are mold-release agents, stabilizers, antioxidants, flame-proofing agents, colorants and pigments, antistatics, nucleating agents, anti-dripping agents as well as organic and further inorganic fillers and reinforcing agents.

The polycarbonate according to the invention may be present in the composition according to the invention in an amount of preferably from 5 to 95 wt. %, particularly preferably from 10 to 90 wt. % and most preferably from 20 to 80 wt. %, based on the weight of the composition. The further polymeric constituents of the composition according to the invention may be present in an amount of preferably from 1 to 60 wt. %, particularly preferably from 1 to 40 wt. % and most preferably from 2 to 30 wt. %, based on the weight of the composition.

The compositions may contain up to 60 wt. %, preferably from 10 to 40 wt. %, based on the filled or reinforced molding composition, of inorganic materials such as fillers and/or reinforcing agents. Flame-proofing agents may be present in the composition according to the invention in an amount of up to 35 wt. %, preferably from 10 to 25 wt. %, based on the weight of the composition.

These and further constituents or additives possibly contained in the compositions according to the invention in addition to the polycarbonates/polyester carbonates are illustrated below by means of examples.

These substances are to be found in many publications, such as, for example, in Additives for Plastics Handbook, John Murphy, 1999, incorporated herein by reference and are commercially available.

1. Suitable antioxidants are, for example:

1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butyl phenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols that are linear or branched in the side chain, for example 2,6-di-nonyl-4-methylphenol, 2,4-dimethyl-6-(1'-methyl-undec-1'-yl) phenol, 2,4-dimethyl-6-(1'-methylheptadec-1'-yl)phenol, 2,4-dimethyl-6-(1'-methyltridec-1'-yl)phenol.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxphenyl stearate, bis(3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzyl mercaptoacetate, tridecyl-4-hydroxy-3,5-di-tert-butylbenzyl mercaptoacetate, tris (3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, dioctadecyl-2-(3-tert-butyl-4-hydroxy-5- methylbenzyl) malonate, didodecylmercaptoethyl-2,2-bis (3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene,2,4,6-tris(3,5-di-tert-butyl-4-hydroxybenzyl)phenol.

1.10. Triazine compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis (3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.11. Acylaminophenols, for example 4-hydroxylauranilide, 4-hydroxytearanilide, octyl-N-(3,5-di-tert-butyl-4-hydroxyphenyl)carbamate.

1.12. Esters of β-(3,5-di-tert-butyl-4-hydroxyphenyl) propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.13. Esters of β-(5-tert-butyl-4-hydroxy-3-methylphenyl) propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.14. Esters of β-(3,5-dicyclohexyl-4-hydroxyphenyl) propionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3,5-di-tert-butyl-4-hydroxyphenylacetic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert-butyl-4-hydroxyphenyl) propionic acid, for example N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]-propionyloxy)ethyl] oxamide (Naugard® XL-1 from Uniroyal).

1.17. Ascorbic acid (vitamin C)

1.18. Amine-type antioxidants, for example N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl) amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis (phenylamino)propane, (o-tolyl)biguanide, bis[4-(1',3'-dimethylbutyl)phenyl]amine, tert-octylated N-phenyl-1-naphthylamine, a mixture of mono- and di-alkylated tert-butyl-/tert-octyl-diphenylamines, a mixture of mono- and di-alkylated nonyldiphenylamines, a mixture of mono- and di-alkylated dodecyldiphenylamines, a mixture of mono- and di-alkylated isopropyl-/isohexyl-diphenylamines, a mixture of mono- and di-alkylated tert-butyldiphenylamines, 2,3-dihydro-3,3-dimethyl-4H-1,4-benzothiazine, phenothiazine, a mixture of mono- and di-alkylated tert-butyl-/tert-octyl-phenothiazines, a mixture of mono- and di-alkylated tert-octylphenothiazines, N-allylphenothiazine, N,N,N',N'-tetraphenyl-1,4-diaminobut-2-ene, N,N-bis(2,2,6,6-tetramethylpiperid-4-ylhexamethylenediamine, bis(2,2,6,6-tetramethylpiperid-4-yl)sebacate, 2,2,6,6-tetramethylpiperidin-4-one, 2,2,6,6-tetramethylpiperidin-4-ol. Such compounds can be used individually or in the form of mixtures.

1.19. Suitable thiosynergists are, for example, dilaurylthiodipropionate and/or distearylthiodipropionate.

2. UV absorbers and light stabilizers can be used in the compositions according to the invention in amounts of from 0.1 to 15 wt. %, preferably from 3 to 8 wt. %, based on the weight of the composition. Suitable UV absorbers and light stabilizers are, for example:

2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'- tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl) phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenyl) benzotriazole, 2,2'-methylene-bis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$, wherein R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl) phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, such as, for example, 4-tert-butylphenyl salicylate, phenyl salicylate, octylphenyl salicylate, bibenzoylresorcinol, bis (4-tert-butylbenzoyl)resorcinol, benzoylresorcinol, 2,4-di-tert-butyl phenyl-3,5-di-tert-butyl 4-hydroxybenzoate, hexadecyl-3,5-di-tert-butyl 4-hydroxybenzoate, octadecyl-3,5-di-tert-butyl 4-hydroxybenzoate, 2-methyl-4,6-di-tert-butylphenyl-3,5-di-tert-butyl 4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands, such as n-butylamine, triethanolamine or N-cyclohexyldiethanolamine, nickel dibutyldithiocarbamate, nickel salts of the monoalkyl esters, for example of the methyl or ethyl ester, of 4-hydroxy-3,5-di-tert-butylbenzylphosphonic acid, nickel complexes of ketoximes, for example of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl), n-butyl-3,5-di-tert-butyl 4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4,5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensation products of N,N'-bis(2,2,6,6-tetramethyl-4-piperidyl)hexamethylenediamine and 4-morpholino-2,6-dichloro-1,3,5-triazine, the condensation product of 2-chloro-4,6-bis(4-n-butylamino-2,2,6,6-tetramethylpiperidyl)-1,3,5-triazine and 1,2-bis(3-aminopropylamino)ethane, the condensation product of 2-chloro-4,6-bis(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino) ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4.5]decane, a reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyloxycarbonyl)-2-(4-methoxyphenyl)ethene, N,N'-bis(formyl)-N,N'-bis(2,2,6,6-tetramethyl-4-piperidyl)hexamethylenediamine, diesters of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and the mixture thereof with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

Such compounds can be used individually or in the form of mixtures.

3. Suitable metal deactivators are, for example, N,N'-diphenyloxamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoylbisphenyl hydrazide, N,N'-diacetyladipoyl dihydrazide, N,N'-bis(salicyloyl) oxalyl dihydrazide, N,N'-bis(salicyloyl)thiopropionyl dihydrazide. Such compounds can be used individually or in the form of mixtures.

4. Phosphites and phosphonites suitable as heat stabilizers are, for example, triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecylpentaerythritol diphosphite, bis(2,4-di-tert-butylphenyl)pentaerythritol diphosphite, bis(2,6-di-tert-butyl-4-methylphenyl) pentaerythritol diphosphite, diisodecyloxypentaerythritol diphosphite, bis(2,4-di-tert-butyl-6-methylphenyl) pentaerythritol diphosphite, bis(2,4,6-tris(tert-butylphenyl) pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyldibenz[d,g]-1,3,2-dioxaphosphocine, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane. Such compounds can be used individually or in the form of mixtures.

Special preference is given to tris(2,4-di-tert-butylphenyl) phosphite (Irgafos® 168, Ciba-Geigy), triphenylphosphine, or (2,4,6-tri-tert-butylphenyl)-(2-butyl-2-ethylpropane-1,3-diyl) phosphite (Ultranox 641®, GE Specialty Chemicals).

Examples of suitable phosphites and phosphonites are also:

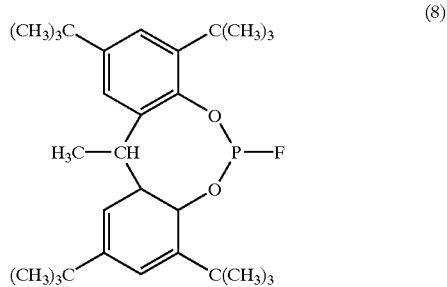

(8)

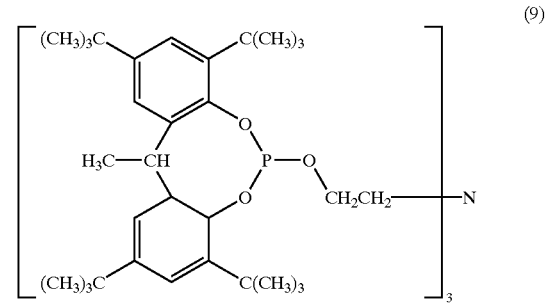

(9)

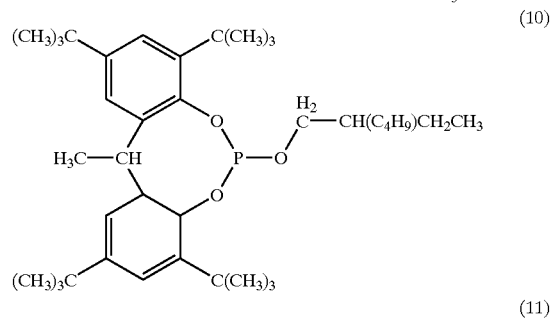

(10)

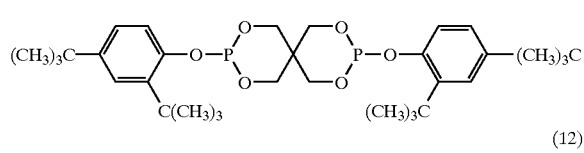

(11)

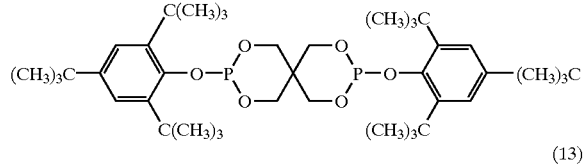

(12)

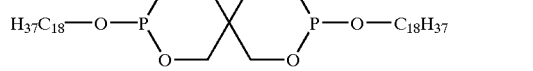

(13)

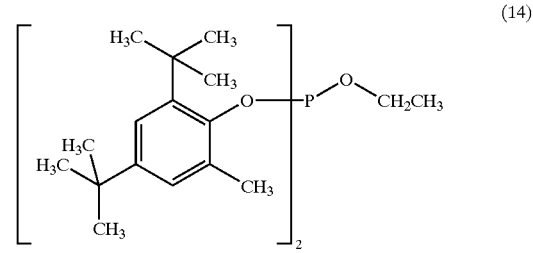

(14)

5. Suitable peroxide catchers are, for example, esters of β-thiodipropionic acid, for example the lauryl, stearyl, myristyl or tridecyl ester, mercaptobenzimidazole or the zinc salt of 2-mercaptobenzimidazole, zinc dibutyldithiocarbamate, dioctadecyl disulfide, pentaerythritol tetrakis (dodecylmercapto)propionate. Such compounds may be used individually or in the form of mixtures.

6. Suitable basic co-stabilizers are, for example, melamine, polyvinylpyrrolidone, dicyanodiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate. Such compounds may be used individually or in the form of mixtures.

7. Suitable nucleating agents are, for example, inorganic substances, such as talc, metallic oxides, such as titanium dioxide or magnesium oxide, phosphates, carbonates or sulfates, preferably of alkaline earth metals; organic compounds, such as mono- or poly-carboxylic acids and their salts, for example 4-tert-butylbenzoic acid, adipic acid, diphenylacetic acid, sodium succinate or sodium benzoate; polymeric compounds, such as ionic copolymers (ionomers). Special preference is given to 1,3:2,4-bis(3',4'-dimethylbenzylidene)sorbitol, 1,3:2,4-di(paramethyldibenzylidene)sorbitol and 1,3:2,4-di(benzylidene)sorbitol. Such compounds may be used individually or in the form of mixtures.

8. Suitable fillers and reinforcing agents are, for example, calcium carbonate, silicates, glass fibers, glass spheres, asbestos, talc, kaolin, mica, barium sulfate, metallic oxides and hydroxides, carbon black, graphite, wollastonite, wood flour and flours or fibers of other natural products, synthetic fibers. Such compounds may be used individually or in the form of mixtures.

9. Other suitable additives are, for example, plasticizers, lubricants, emulsifiers, pigments, viscosity-modifying agents, catalysts, flow agents, optical brightening agents, flame-proofing agents, antistatic agents and blowing agents.

10. Suitable benzofuranones and indolinones are, for example, those which are disclosed in U.S. Pat. Nos. 4,325,863; 4,338,244; 5,175,312; 5,216,052; 5,252,643; DE-A-4 316 611; DE-A-4 316 622; DE-A-4 316 876; EP-A-0 589 839 or EP-A-0 591 102, or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, lactone antioxidants such as (15)

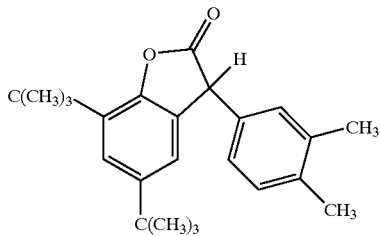

Such compounds act, for example, as antioxidants. Such compounds may be used individually or in the form of mixtures.

11. Suitable fluorescing plasticizers are those listed in "Plastics Additives Handbook", eds. R. Gächter and H. Müller, Hanser Verlag, 3rd edition, 1990, pages 775–789.

12. Suitable mold-release agents are esters of aliphatic acids and alcohols, for example pentaerythritol tetrastearate and glycerol monostearate, they may be used alone or in a mixture preferably in an amount of from 0.02 to 1 wt. %, based on the weight of the composition.

13. Suitable flame-retardant additives are phosphate esters, i.e. triphenyl phosphate, resorcinoldiphosphoric acid esters, bromine-containing compounds, such as brominated phosphoric acid esters, brominated oligocarbonates and polycarbonates, as well as salts, such as $C_4F_9SO_3^-Na^+$.

14. Suitable agents imparting impact resistance are butadiene rubber with styrene-acrylonitrile or methyl methacrylate grafted thereon, ethylene-propylene rubbers with maleic anhydride grafted thereon, ethyl- and butyl-acrylate rubbers with methyl methacrylate or styrene acrylonitrile grafted thereon, interpenetrating siloxane and acrylate networks with methyl methacrylate or styrene-acrylonitrile grafted thereon.

15. Suitable polymers are SAN, ABS, PMMA, PTFE, PSU, PPS, polyolefins, such as polyethylene, polypropylene and ethylene-propylene rubbers, epoxy resins, polyesters, such as PBT, PET, PCT, PCTG and PETG, as well as other polycarbonates produced by the interface process.

16. Suitable antistatic agents are sulfonate salts, for example tetraethylammonium salts of $C_{12}H_{25}SO^{3-}$ or $C_8F_{17}SO^{3-}$.

17. Suitable coloring agents are pigments as well as organic and inorganic colorants.

18. Compounds containing epoxy groups, such as 3,4-epoxycyclohexylmethyl-3,4-epoxycyclohexyl carboxylate, copolymers of glycidyl methacrylate and epoxysilanes.

19. Compounds containing anhydride groups, such as maleic anhydride, succinic anhydride, benzoic anhydride and phthalic anhydride.

The compounds of groups 18 and 19 act as melt stabilizers. They may be used individually or in mixtures.

The compositions (molding compositions) according to the invention may be prepared by mixing the respective constituents in a known manner and melt-compounding or melt-extruding the mixture at temperatures of approximately 200° C. and, for example, at temperatures of from 200° C. to 300° C. in conventional apparatuses such as internal kneaders, extruders and double-shaft screws. The individual constituents may be mixed either in succession or simultaneously, either at approximately 20° C. (room temperature) or at a higher temperature.

The molding compositions according to the invention may be used in the production of molded articles of any kind. Such molded articles may be produced by injection molding, extrusion and blow molding processes. A further form of processing is the production of molded articles by deep-drawing from previously prepared sheets or films.

Examples of molded articles according to the invention are profile sections, films, casing parts of any kind, for example for domestic appliances, such as juice extractors, coffee machines, mixers; for office equipment, such as monitors, printers, copiers; sheets, tubes, ducts for electric installations, windows, doors and profile sections for the construction sector, interior finishing and exterior applications; in the field of electrical engineering, such as for switches and plugs. The molded bodies according to the invention may also be used for interior fittings and components for railway vehicles, ships, aircraft, buses and other motor vehicles as well as for motor vehicle body parts.

The molded articles according to the invention may be transparent or opaque. Further molded articles are especially optical and magneto-optical data storage media, such as mini disks, compact disks (CD) or digital versatile disks (DVD), food and drinks packaging, optical lenses and prisms, lenses for illumination purposes, motor vehicle headlamp lenses, glazing for buildings and motor vehicles, glazing of other types, such as for greenhouses, so-called webbed double sheets or cavity sheets.

The Examples which follow serve to illustrate the invention further.

EXAMPLES

The polymers of Examples 1 to 3 were prepared by melt polymerization of diphenylcarbonate and bisphenol A in the melt using tetraphenylphosphonium phenolate and 250 parts of sodium phenolate, calculated as sodium, as catalyst. The amounts of monomers and catalyst are indicated in Table 1. The reaction conditions are indicated in Table 2. The measured relative viscosity of the solution, the yellowing index (YI), the melt viscosity, the shear thinning ratio and the amounts of the multifunctional compounds are indicated in Table 3.

Comparison Examples 1, 2 and 3 are linear polycarbonates and were prepared by a conventional interface polymerization process. They are marketed by Bayer AG under the trademark Makrolon® and are grades 2808, 2408 and 3108. The polymers of Comparison Examples 4 and 5 are branched polycarbonates which were prepared by the interface polymerization process. Corresponding products are marketed by Bayer AG under the trademark Makrolon® and are grades 1243 and 1239. Comparison Examples 7, 8 and 9 were prepared by reaction of diphenyl carbonate and bisphenol A in the melt using tetraphenylphosphonium phenolate as catalyst. The polycarbonate of Example 6 was prepared by reaction of diphenyl carbonate and bisphenol A in the melt using tetraphenylphosphonium phenolate and 100 ppb of sodium phenolate and 100 ppb of sodium phenolate.

It is possible to use for the polymerization a conventional transesterification vessel that is suitable for heating and evacuation of the material and permits a sufficiently long mixing and dwell time.

The relative viscosity was measured in a 0.5% solution of methylene chloride at 20° C.

The yellowness index (YI) was determined on injection-molded specimens having a thickness of 4 mm, in accordance with CIELAB methods. Injection molding was carried out at 270° C., 300° C. and 330° C.

The melt viscosity was determined using the test method according to ISO 11443 at 280° C. The non-Newtonian flow behavior was quantified by calculating the shear thinning ratio. The shear thinning ratio was calculated as the melt viscosity at a shear rate of 50 s$^{-1}$, divided by the melt viscosity at a shear rate of 5000 s$^{-1}$.

The amount of multifunctional compounds was determined by separating off the monomeric compounds by HPLC (high pressure liquid chromatography) after total hydrolysis of the polycarbonate. The compounds were characterized by magnetic resonance spectroscopy techniques.

TABLE 1

| Example | C6 | C7 | C8 | C9 | 1 | 2 | 3 |
|---|---|---|---|---|---|---|---|
| DPC, mol. | 1.18 | 1.173 | 1.187 | 1.168 | 1.178 | 1.214 | 1.209 |
| BPA, mol. | 1.0 | 1.0 | 1.0 | 1.0 | 1.0 | 1.0 | 1.0 |
| Sodium phenolate (ppb), calculated as sodium | 100 | 0.0 | 0.0 | 0.0 | 250 | 250 | 250 |
| Tetraphenylphosphonium phenolate, mol. | 0.00004 | 0.00004 | 0.00004 | 0.00004 | 0.00004 | 0.00004 | 0.00004 |

DPC: diphenyl carbonate; BPA: bisphenol A

TABLE 2

| Reaction conditions for Comparison Examples 6 to 9 and Examples 1 to 3 | Time (min) | Temperature (° C.) | Pressure (mbar) |
|---|---|---|---|
| Pre-condensation | 45 | 190 | 1000 |
| Reactor I | 20 | 190 | 200 |
| Reactor II | 20 | 230 | 80 |
| Reactor III | 10 | 250 | 50 |
| Reactor IV | 10 | 270 | 25 |
| Reaction conditions for Comparison Example 6 | | | |
| Evaporator I | 45 | 275 | 7.4 |
| Evaporator II | 130 | 310 | 1.40 |
| Reaction conditions for Comparison Example 7 | | | |
| Evaporator I | 45 | 275 | 7.3 |
| Evaporator II | 130 | 312 | 1.00 |
| Reaction conditions for Comparison Example 8 | | | |
| Evaporator I | 45 | 275 | 5.5 |
| Evaporator II | 130 | 312 | 0.5 |
| Reaction conditions for Comparison Example 9 | | | |
| Evaporator I | 45 | 275 | 7.3 |
| Evaporator II | 130 | 312 | 0.98 |
| Reaction conditions for Example 1 | | | |
| Evaporator I | 45 | 275 | 8.5 |
| Evaporator II | 120 | 310 | 2.25 |
| Reaction conditions for Example 2 | | | |
| Evaporator I | 45 | 275 | 6.5 |
| Evaporator II | 120 | 310 | 0.90 |
| Reaction conditions for Example 3 | | | |
| Evaporator I | 45 | 275 | 6.5 |
| Evaporator II | 120 | 310 | 1.26 |

TABLE 3

| Example | | C1 | C2 | C3 | C4 | C5 | C6 | C7 | C8 | C9 | 1 | 2 | 3 |
|---|---|---|---|---|---|---|---|---|---|---|---|---|---|
| Relative viscosity | | 1.294 | 1.259 | 1.322 | 1.287 | 1.318 | 1.292 | 1.277 | 1.283 | 1.287 | 1.276 | 1.269 | 1.291 |
| YI (molding at 270° C.) | | 2.0 | 1.8 | | | | 3.7 | 2.6 | 2.8 | 2.6 | 4.0 | | |
| YI (molding at 300° C.) | | 2.2 | 1.9 | | | | | | | | 4.2 | 4.5 | |
| YI (molding at 330° C.) | | 2.4 | 2.0 | | | | 3.8 | 2.5 | 2.8 | 2.6 | 4.4 | | |
| Melt viscosity at 50 s$^{-1}$ and 280° C. | Pa·s | 1002 | 593 | 1685 | 1272 | 2075 | 1071 | 770 | 782 | 904 | 775 | 705 | 980 |
| Melt viscosity at 5000 s$^{-1}$ and 280° C. | Pa·s | 186 | 148 | 214 | 167 | 205 | 188 | 160 | 159 | 170 | 139 | 132 | 150 |
| Shear thinning ratio | | 5.4 | 4.0 | 7.9 | 7.6 | 10.1 | 5.7 | 4.8 | 4.9 | 5.3 | 5.6 | 5.3 | 6.5 |
| A | ppm | <5 | <5 | <5 | <5 | <5 | 178 | <5 | 53 | 59 | 639 | 756 | 657 |
| B | ppm | <5 | <5 | <5 | <5 | <5 | 1475 | 226 | 231 | 256 | 1875 | 1946 | 1797 |
| C | ppm | <5 | <5 | <5 | <5 | <5 | 337 | 6 | 10 | 21 | 708 | 904 | 716 |
| D | ppm | <5 | <5 | <5 | <5 | <5 | 692 | 138 | 144 | 175 | 1015 | 1015 | 801 |

Although the novel melt-polymerized polycarbonates contain multifunctional structural units, have a high degree of branching and exhibit pronounced non-Newtonian flow properties, the polycarbonates have surprisingly good flow behavior. The polycarbonates of the Examples in which 250 ppb of sodium phenolate are used have a high degree of branching, which is shown by the shear thinning ratio. The comparison example with only 100 ppb of sodium phenolate has a shear thinning ratio which is comparable with that of linear polycarbonate having the same viscosity. The pronounced non-Newtonian flow properties were therefore achieved only when relatively large amounts of branching compounds were present. The high degree of branching was achieved without the usual formation of compounds having a high degree of yellowing.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A melt-polymerized polycarbonate having a weight average molecular weight of 5000 to 80000 and a structure conforming to formula (1)

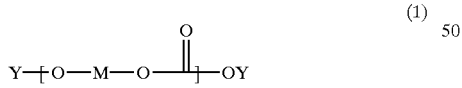
(1)

wherein the square brackets denote a repeating structural unit,

M denotes Ar or a multifunctional compound A and wherein

Ar conforms to formula (2)

(2)

or to formula (3)

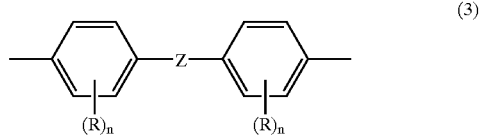
(3)

wherein
Z=$C_1$–$C_8$-alkylidene or $C_5$–$C_{12}$-cycloalkylidene, S, $SO_2$ or a single bond, R is a substituted or unsubstituted phenyl, methyl, propyl, ethyl, butyl, Cl or Br, and n represents 0, 1 or 2,
and wherein A conforms to

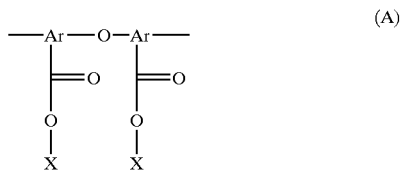
(A)

wherein said A is present in the polycarbonate in an amount of from 200 to 5000 ppm,
and wherein
Y denotes H or conforms to formula (4)

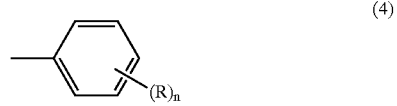
(4)

wherein
R independently one of the others is H, $C_1$–$C_{20}$-alkyl, $C_6H_5$ or $C(CH_3)_2C_6H_5$ and n is 0, 1, 2 or 3,
and X is Y or —(MOCOO)Y,
and wherein the melt-polymerized polycarbonate has a shear thinning ratio y in accordance with the equation $y > 0.30 + 0.1312 x^{14.881}$, wherein x is the relative viscosity of the polycarbonate.

2. The melt-polymerized polycarbonate according to claim 1, wherein M further denotes B having the formula

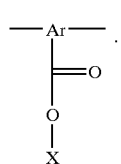
(B)

3. The melt-polymerized polycarbonate according to claim 1 wherein M further denotes C having the formula

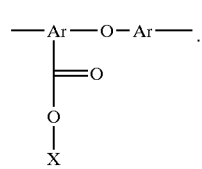
(C)

4. The melt-polymerized polycarbonate according to claim 1 wherein M further denotes D having the formula

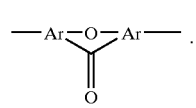
(D)

5. A melt-polymerized polycarbonate resin having a weight average molecular weight of 5000 to 80000 conforming to formula (1)

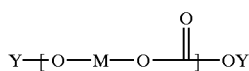
(1)

wherein the square brackets denote a repeating structural unit, where
M denotes Ar and at least one member selected from the group consisting of A, B, C and D
wherein
Ar conforms to formula (2)

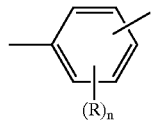
(2)

or to formula (3)

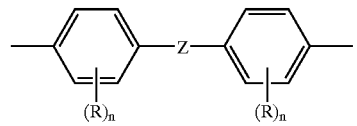
(3)

where Z denotes a member selected from the group consisting of $C_1$–$C_8$-alkylidene, $C_5$–$C_{12}$-cycloalkylidene, S, $SO_2$ and a single bond,
R is Cl or Br or a substituted or unsubstituted member selected from the group consisting of phenyl, methyl, propyl, ethyl and butyl and n is 0, 1 or 2, and wherein A conforms to

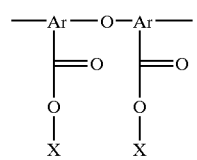
(A)

and is present in the polycarbonate in an amount of 201 to 5000 ppm,
and B conforms to

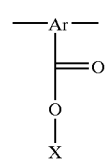
(B)

and is present in the polycarbonate in an amount of 1501 to 10000 ppm,
and C conforms to

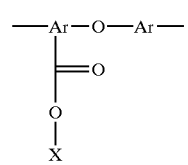
(C)

and is present in the polycarbonate in an amount of 351 to 5000 ppm,
and D conforms to

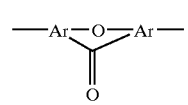
(D)

and is present in the polycarbonate in an amount of 751 to 5000 ppm,
and wherein Y denotes H or conforms to formula (4)

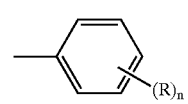
(4)

where R independently one of the others is H, $C_1$–$C_{20}$-alkyl, $C_6H_5$ or $C(CH_3)_2C_6H_5$ and n is 0, 1, 2 or 3,
and X is Y or —(MOCOO)Y.

6. The polycarbonate according to claim 5 having a shear thinning ratio y in accordance with the equation $y > 0.30 + 0.1312 x^{14.881}$, wherein x is the relative viscosity of the polycarbonate.

7. A molding composition containing the melt-polymerized polycarbonate according to claim 5.

8. A molded article containing the composition according to claim 7.

9. A process for the preparation of the polycarbonate of claim 5 comprising a melt polymerization in the presence of a catalyst at a temperature of from 150 to 400° C. and a pressure of from 1000 mbar to 0.01 mbar, wherein catalyst conforms to formula (7)

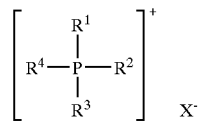 (7)

wherein $R^1$, $R^2$, $R^3$ and $R^4$ independently denote $C_1$- to $C_{18}$-alkylenes, $C_6$- to $C_{10}$-aryls or $C_5$- to $C_6$-cycloalkyls and $X^-$ represents an anion, in which the corresponding acid-base pair $H^+ + X^- \leftrightarrows HX$ has a $pK_b$ of <11, and in the presence of a co-catalyst selected from the group consisting of amine salts, salts of alkali metals and salts of alkaline earth metals, hydroxides, alkoxides and aryloxides of silicon, sodium and potassium, in amounts of from 240 to 500 ppb, calculated as sodium.

10. The process of claim 9 wherein the catalyst is a mixture of tetraphenylphosphonium phenolate and sodium phenolate.

* * * * *